United States Patent [19]

Nagahiro et al.

[11] 3,784,128

[45] Jan. 8, 1974

[54] TAPE DRIVE CONTROL SYSTEM

[75] Inventors: Michinori Nagahiro, Nishinomiya; Toshiomi Yabu, Kyoto; Hiroo Hosono, Hirakata; Masaharu Ushihara, Katano, all of Japan

[73] Assignee: Matsushita Electric Industrial Co., Ltd., Osaka, Japan

[22] Filed: Oct. 13, 1972

[21] Appl. No.: 297,489

[30] Foreign Application Priority Data

Oct. 15, 1971 Japan ............................... 46/95863

[52] U.S. Cl. .............................. 242/201, 200/61.15

[51] Int. Cl. ........................ B11b 15/32, G03b 1/04

[58] Field of Search ........................... 242/201–208; 200/61.14–61.16; 74/10.22

[56] References Cited

UNITED STATES PATENTS

| | | | |
|---|---|---|---|
| 2,843,688 | 7/1958 | Masem | 200/61.15 |
| 2,943,804 | 7/1960 | Loewe et al. | 242/191 X |

*Primary Examiner*—Leonard D. Christian
*Attorney*—Richard K. Stevens et al.

[57] ABSTRACT

A system for automatically effecting various controls of the tape drive system in magnetic recording and reproducing systems or similar systems using magnetic tape in accordance with the tape position.

8 Claims, 5 Drawing Figures

TAPE DRIVE CONTROL SYSTEM

This invention relates to tape drive control systems for use in magnetic recording and reproducing systems and similar systems using a magnetic tape medium.

In magnetic recording and reproducing systems, for instance in a magnetic video tape recorder (VTR) using single reel type cartridge, the cartridge tape is played back from the outset or pay-off end of the tape after its loading. Therefore, if it is desired to watch a source recorded toward the last end of the tape for the first time, it is necessary to feed the tape at first at the fast feed state and to pay attention so that the tape will not be fed beyond the intended point. This waiting time is usually felt longer than it actually is.

Also, if it is desired to play back a previous source once again, it is necessary to rewind the tape and pay attention until the tape is rewound to the intended position.

Further, it has been desired to be able to automatically stop the tape or switch over to a next operation upon reaching of a preset position in the recording, playback, rewind or fast feed operation.

The present invention has been intended on the basis of the above aspects, and its one object is to provide a tape drive control system, with which operations can be automatically switched upon reaching of a predetermined position preset by a setting pointer provided in a tape position indicating means.

A second object of the invention is to provide a tape drive control system, with which the recording or playback state can automatically set in when the tape is driven in the fast feed state up to a predetermined position determined by a setting pointer provided in a tape position indicating means.

A third object of the invention is to provide a tape drive control system, with which the recording or playback state can automatically be set in when the tape is driven in the rewind state up to a predetermined position determined by a setting pointer provided in a tape position indicating means.

A fourth object of the present invention is to provide a tape drive control system in which means are provided for detecting the end portion of the tape during the recording or playback of the same and upon detection of the end portion, the tape is automatically rewound so as to be in a preset position determined by the setting pointer and then again driven for recording or playback of the tape from that position whereby the recording or playback of the tape is automatically repeated on the portion thereof between the preset position and the end portion thereof.

The above and other objects of the invention will become more apparent from the following description of a preferred embodiment of the invention with reference to the accompanying drawing, in which.

Figure 2:
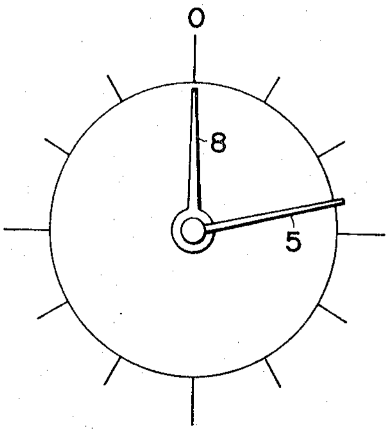
FIG. 2 is an elevational view of part of the same embodiment.

Referring to the drawing, a manual knob shaft 1 is rotatably mounted on a support 3 secured to a base plate 2. The knob shaft 1 is spring biased by a spring 4 provided between it and the support 3, so that for the rotation of the shaft 1 a force surpassing the frictional force provided by the spring is required. The knob shaft 1 carries a setting pointer 5 and a first contact plate 6 both secured to it. Concentrically fitted on the knob shaft 1 is a hollow cylindrical member 7 which is rotatable relative thereto. The member 7 has an indicating pointer 8 secured to its one end and a second contact plate 9 secured to its other end. The first and second contact plates 6 and 9 face each other. A drive member 10 is slidably coupled through a spring 11 to the cylindrical member 7, and it has a peripheral gear 12.

Meshing with the gear 12 is a gear 13, which is, for instance, coupled to a rotor coupled to a reel base and rotating in association with the extent of tape feed.

Numeral 14 designates a transparent front plate, which is graduated in correspondence to the tape feed extent and concentrically with respect to the knob shaft 1 as shown in FIG. 2.

Figure 3:
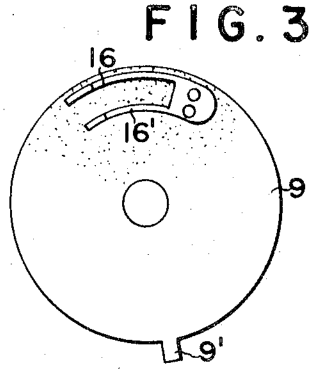

FIG. 3 shows the second contact plate 9. As is shown, it has a peripheral protuberance 9', which is adapted to engage a stopper 15 provided on the base plate when the pointer 8 comes to zero point of the gradation. The rotation of the contact plate 9 is stopped when the protuberance 9' comes into engagement wth the stopper 15. The second contact plate 9 also has brush contacts 16 and 16' on its side facing the first contact plate 6.

Figure 4:
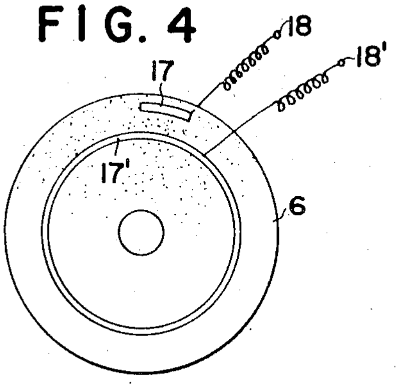
FIGS. 3 and 4 are plan views of respective component parts.

FIG. 4 shows the first contact plate 6. As is shown, it is provided on its side facing the second contact plate 9 with a short arcular contact 17 and an annular contact 17'. The first and second contact plates 6 and 9 constitute control switch such that current is passed between leads 18 and 18' only when the brush 16 and contact 17 are in contact with each other.

Figure 5:
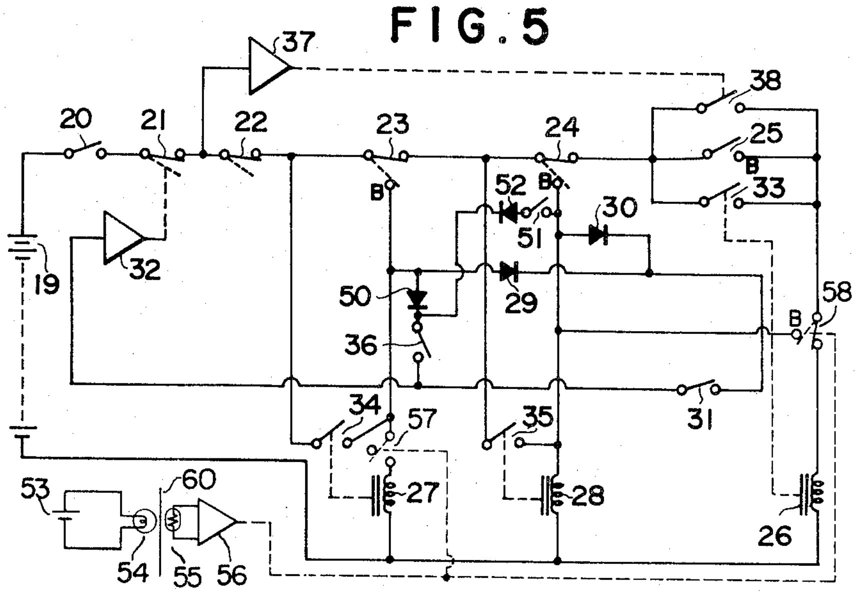
FIG. 5 is a schematic showing electric connection of the same embodiment.

FIG. 5 shows the internal electric connection. A power supply 19 may be connected through a power supply switch 20, a relay switch 21 to be described hereinafter, a stop switch 22, a fast feed operation switch 23, a rewind operation switch 24 and recording and reproducing operation switch 25 to a solenoid 26 for recording and reproducing operation.

The fast feed and rewind operation switches 23 and 24 have respective normally open terminals B, which are respectively connected to a fast feed operation solenoid 27 and rewind operation solenoid 28 and are also connected through respective diodes 29 and 30 to a switch 31, which is in turn connected to delaying relay 32 controlling the afore-mentioned relay switch 21. Numerals 33, 34 and 35 designate self-sustaining switches for the respective solenoids 26, 27 and 28.

Figure 1:
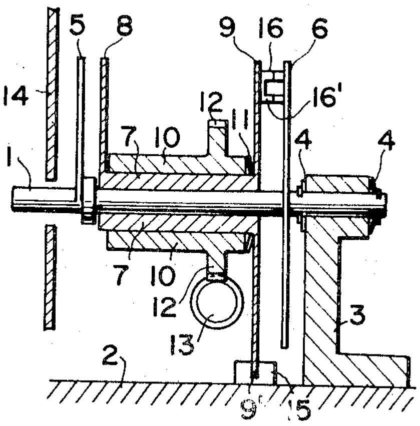
FIG. 1 is a fragmentary sectional view showing an embodiment of the invention.

The fast feed operation switch 23 has its terminal B connected in series with a diode 50 and a control switch 36, which is constituted by the brush contacts 16 and 16' and contacts 17 and 17' shown in FIG. 1, to the delaying relay 32.

The rewind operation switch 24 has its terminal B connected in series with an auto-repeat operation switch 51, a diode 52 and the afore-mentioned control switch 36 to the delaying relay 32.

The junction between the relay switch 21 and stop switch 22 is connected to the delaying relay 37, which is constructed such that as to render a relay switch 38 in parallel with the recording and reproducing operation switch 25 "ON" only during an initial short period from the instant of impression of voltage upon it.

A lamp 54 is connected across both terminals of a lamp power source 53 and placed at one side of a tape 60, while a photosensitive element 55 is placed at the other side of the tape 60 and adaptable to receive a light-ray from the lamp when the tape is absence thereby detecting whether the tape is present or not by means of a switching circuit 56 which is connected to the photosensitive element 55. The switching circuit 56 is operatively connected to switches 57 and 58. The switch 57 is connected at one end thereof to the contact B, the fast feed operation switch 23 and the self-sustaining switch 34 for the fast feed operation solenoid 27, and connected at the other end to the solenoid 27. The switch 58 has a normally-close contact connected between the recording and reproducing operation switch 25 and the solenoid 26 and a normally-open contact B connected to the rewind operation solenoid 28. The switching circuit is arranged such that the switch 57 is closed and the switch 58 is positioned to make the normally-open contact B closed when the photosensitive element detects the presence of the tape 60. The lamp and the photosensitive element is mounted in the passage of the tape driven between the winding and rewinding reels.

The operation of the construction described above will now be described. The setting pointer 5 is set by rotating the knob shaft 1 to a gradation corresponding to a desired tape position from which to start the recording or playback. Then, by closing the power supply switch 20 shown in FIG. 5 and subsequently throwing the pole of the fast feed operation switch 23 to the B terminal side for a short period, current is caused to pass through the fast feed operation solenoid 27, closing the self-sustaining switch 34 for the fast feed operation. As the fast feed operation continues, the indicating pointer 8 is rotated through the gears 13, 12 in accordance with the extent of tape feed. When both the pointers 5 and 8 come to overlap each other, the brushes 16 and 16′ are brought into contact with the respective contacts 17 and 17′.

This means that the control switch 36 shown in FIG. 5 is closed. Upon closure of this switch 36, the power supply is coupled through the switch 36 and the self-sustaining relay 34 to the delaying relay 32. As a result, the relay switch 21 is rendered "OFF" for a certain time required to stop the tape.

Upon reclosure of the relay switch 21, the self-sustention is released to stop the fast feed operation, while at the same time with the concurrent coupling of the power supply to the delaying relay 37, the switch 38 is closed, so that the solenoid 26 is energized and self-sustained for recording or playback.

The recording or playback can be automatically begun from a predetermined tape position as determined by the setting pointer 5 subsequent to the rewind operation. In this case, the auto-repeat operation switch 51 is closed prior to the rewind operation. Then, by throwing the pole of the rewind operation switch 24 to the B terminal for a short period, current is caused to pass through the rewind operation solenoid 28, closing the self-substaining relay 35 for the rewind operation. With the rewind operation, the indicating pointer 8 is rotated through the gears 13 and 12 in accordance with the extent of tape progress. When both the pointers 5 and 8 come to overlap each other, the brushes 16 and 16′ are brought into contact with the respective contacts 17 and 17′, that is, the control switch 36 is closed, as mentioned earlier.

Upon closure of the switch 36, the power supply is coupled through the self-sustaining relay 35, auto-repeat operation switch 51, diode 52 and switch 36 to the delaying relay 32, so that the relay switch 21 is rendered "OFF" for a time interval required for the tape to be stopped as mentioned earlier.

Thereafter, the same sequence of events as has been described before takes place to bring about the recording or playback state.

To manually begin the recording or playback subsequent to the fast feed or rewind operation, the switch 31 is rendered "ON" for a short period. By so doing, a similar sequence to that which has been mentioned takes place to bring about the recording or playback state. The poles of the switches 23, 24 and 25 are thrown to the B terminal side only while these switches are depressed.

As holding the auto-repeat operation switch at its closing position, the recording or playback is continued. After the recording or playback has been completed through over the tape, a transparent tape attached to the end portion of the tape reaches between the photosensitive element 55 and the lamp 54 thereby permitting the light-ray of the lamp to be received by the photosensitive element 55 through the transparent tape, causing the switching circuit 56 to operate so as to close the normally-open contact B of the switch 58 and to open the switch 57, and permitting the rewind operation solenoid 28 to be energized through the contact B of the switch 58, thereby closing the self-sustaining switch 35, causing the tape to be rewound. When the tape is rewound thereby to brought to a preset position, the switch 36 is closed in a manner as described previously, actuating the delay switch 32, changing the relay 21 to the off position for a short time and then returning to the "ON" position, thereby actuating the delay relay 37 which in turn causes the switch 38 to be placed at the "ON" position, for a predetermined time, energizing the recording and playback driving solenoid 26, closing the self-sustaining switch 33. Thus the drive is changed to the recording or playback mode. The above operations may be repeated.

Turning now back to the construction of FIG. 1, in order to ensure that the indicating pointer 8 is exactly returned to the zero gradation point when the tape is completely rewound, a slight speed increase means (not shown) may be provided between the drive member 10 and a rotor coupled to a reel base or the like and rotating with the tape progress. This means is adapted to cause a slightly greater number of rotations of the drive member 10 than the number of rotations of the rotor at the time of the rewind operation. By so doing, the cylindrical member 7 (and hence the pointer 8) returns to the zero position and stops its rotation as the protuberance 9′ provided on the contact plate 9 comes into engagement with the stopper 8 slightly earlier than the completion of rewinding of the tape. However, the drive member 10 will subsequently continue to rotate against the friction with the cylindrical member 7 for a while, so that at the time of completion of rewinding the pointer 8 will have been pointing exactly the zero gradation.

What is claimed is:

1. A tape drive control system comprising an indicating pointer displaced according to the extent of tape programs, a first contact moved according to the displacement of said indicating pointer, a setting pointer, and a second contact displacable by a manual knob independently of the tape progress, said second contact being displacable in accordance with the displacement of said setting pointer along the path of displacement of said first contact, said first and second contacts constituting a control switch to control the tape drive.

2. A tape drive control system comprising a first contact displaceable to a desired position by operating a manual knob, a second contact displaced according to the extent of tape progress, said first and second contacts constituting a control switch, an operation releasing switch, a fast feed operation switch, a fast feed operation solenoid means having a self-sustaining function, a recording/playback operation switch, a recording/playback operation solenoid means having a self-sustaining function, a voltage source, the voltage of said voltage source being adapted to be coupled through said operation releasing switch and said fast feed operation switch to said fast feed operation solenoid means, said voltage being also adapted to be coupled through said recording/playback operation switch to said recording/playback operation solenoid means, a delaying relay, said voltage being further adapted to be coupled through said control switch to said delaying relay, said delaying relay being capable of rendering said operation releasing switch "ON" at least for a time required for stopping the tape from the fast feed state when said voltage is coupled to said delaying relay, and a relay adapted to render a switch in parallel with said recording/playback operation switch "ON" only during an initial stage of impression of said voltage upon said last-mentioned relay.

3. A tape drive control system comprising a first contact displacable to a desired position by operating a manual knob, a second contact displaced according to the extent of tape progress, said first and second contacts constituting a control switch, an operation releasing switch, a rewind operation switch, a rewind operation solenoid means having a self-sustaining function, a recording/playback relay, a recording/playback operation solenoid means having a self-sustaining function, a voltage source, the voltage of said voltage source being adapted to be coupled through said operation releasing switch and said rewind operation switch to said rewind operation solenoid means, said voltage being also adapted to be coupled through said recording/playback operation switch to said recording/playback operation solenoid means, a delaying relay, said voltage being further adapted to be coupled through said control switch to said delaying relay, said delaying relay being capable of rendering said operation releasing switch "ON" at least for a time required for stopping the tape from the rewind state when said voltage is coupled to said delaying relay, and a relay adapted to render a switch in parallel with said recording/playback operation switch "ON" only during an initial stage of compression of said voltage upon said last-mentioned relay.

4. The tape drive control system according to claim 2, which further comprises a switch provided in parallel with said control switch.

5. The tape drive system according to claim 4, which further comprises a switch provided in parallel with said control switch.

6. A tape drive system comprising a first contact displaceable to a desired position by operating a manual knob, a second contact displaced according to the extent of tape progress, said first and second contacts constituting a control switch, a voltage source, an operation releasing switch, a series circuit consisting of normally open fast feed and rewind operation switches, a normally open recording/playback operation switch, the voltage of said voltage source being adapted to be coupled through said operation releasing switch and said series circuit to one terminal of said recording/playback operation switch, a recording/playback solenoid means connected to the other terminal of said recording/playback operation switch, fast feed and rewind operation solenoid means respectively having a self-sustaining function and respectively connected to a normally open terminal of the associated fast feed and rewind operation switches, said fast feed and rewind operation switches being connected through respective diodes to one contact of said control switch, a delaying relay connected to the other contact of said control switch and adapted to render said operation releasing switch "ON" at least for a time required to stop the tape from the fast feed or rewind stage when said voltage from said voltage source is coupled to said delaying relay, and a relay adapted to render a switch in parallel with said recording/playback operation switch "ON" only during an initial stage of impression of said voltage upon said last-mentioned relay.

7. The tape drive control system according to claim 6, wherein said fast feed and rewind switches have their normally open terminals connected through respective diodes and a common switch in series therewith to said delaying relay.

8. The tape drive control system according to claim 3, which further comprises an auto-repeat operation switch inserted in series with said control switch.

* * * * *